US012576382B2

(12) United States Patent
Van Der Helm et al.

(10) Patent No.: US 12,576,382 B2
(45) Date of Patent: Mar. 17, 2026

(54) CERAMIC COATING ON METAL PARTS TO REDUCE DEPOSIT OF METALLIC TRANSITION METALS IN HYDROGENATION REACTIONS

(71) Applicant: DSM IP ASSETS B.V., Heerlen (NL)

(72) Inventors: Radhika Van Der Helm, Kaiseraugst (CH); Thomas Wellauer, Kaiseraugst (CH); Andreas Wernli, Kaiseraugst (CH); Peter Claes, Harrogate (GB)

(73) Assignee: DSM IP ASSETS B.V., Maastricht (NL)

( * ) Notice: Subject to any disclaimer, the term of this patent is extended or adjusted under 35 U.S.C. 154(b) by 151 days.

(21) Appl. No.: 18/026,702

(22) PCT Filed: Sep. 20, 2021

(86) PCT No.: PCT/EP2021/075753
§ 371 (c)(1),
(2) Date: Mar. 16, 2023

(87) PCT Pub. No.: WO2022/058576
PCT Pub. Date: Mar. 24, 2022

(65) Prior Publication Data

US 2023/0338915 A1 Oct. 26, 2023

(30) Foreign Application Priority Data

Sep. 21, 2020 (EP) .................................... 20197210

(51) Int. Cl.
*B01J 19/00* (2006.01)
*B01J 19/02* (2006.01)

(52) U.S. Cl.
CPC ............ *B01J 19/02* (2013.01); *B01J 19/002* (2013.01); *B01J 2219/00331* (2013.01);
(Continued)

(58) Field of Classification Search
CPC . B01J 19/02; B01J 19/002; B01J 8/008; B01J 2219/0072; B01J 2219/00331;
(Continued)

(56) References Cited

U.S. PATENT DOCUMENTS 6,354,824 B1 * 3/2002 Mills ....................... F04C 2/084 418/152
2004/0024273 A1 2/2004 Bottcher et al.
(Continued)

FOREIGN PATENT DOCUMENTS

CA 2105305 * 6/2007
CA 2105305 C * 6/2007 ............ C10G 35/00
(Continued)

OTHER PUBLICATIONS

International Search Report for PCT/EP2021/075753, mailed Dec. 21, 2021, 5 pages.
(Continued)

*Primary Examiner* — Prem C Singh
*Assistant Examiner* — Brandi M Doyle
(74) *Attorney, Agent, or Firm* — NIXON & VANDERHYE P.C.

(57) ABSTRACT

The present invention relates to a method of reducing the deposit of metallic transition metal, particularly palladium, on a metal part in hydrogenation reactions using hydrogen and a heterogenous supported palladium catalyst. These metallic transition metal deposit, particularly palladium deposits, are particularly formed at areas which are exposed to high velocity and shear forces of the hydrogenation mixture comprising the transition metal catalyst, particularly palladium catalyst. They are significantly reduced or even avoided when the surface of the respective metal parts are coated by a plasma sprayed ceramic coating.

22 Claims, 4 Drawing Sheets

Figure 1:
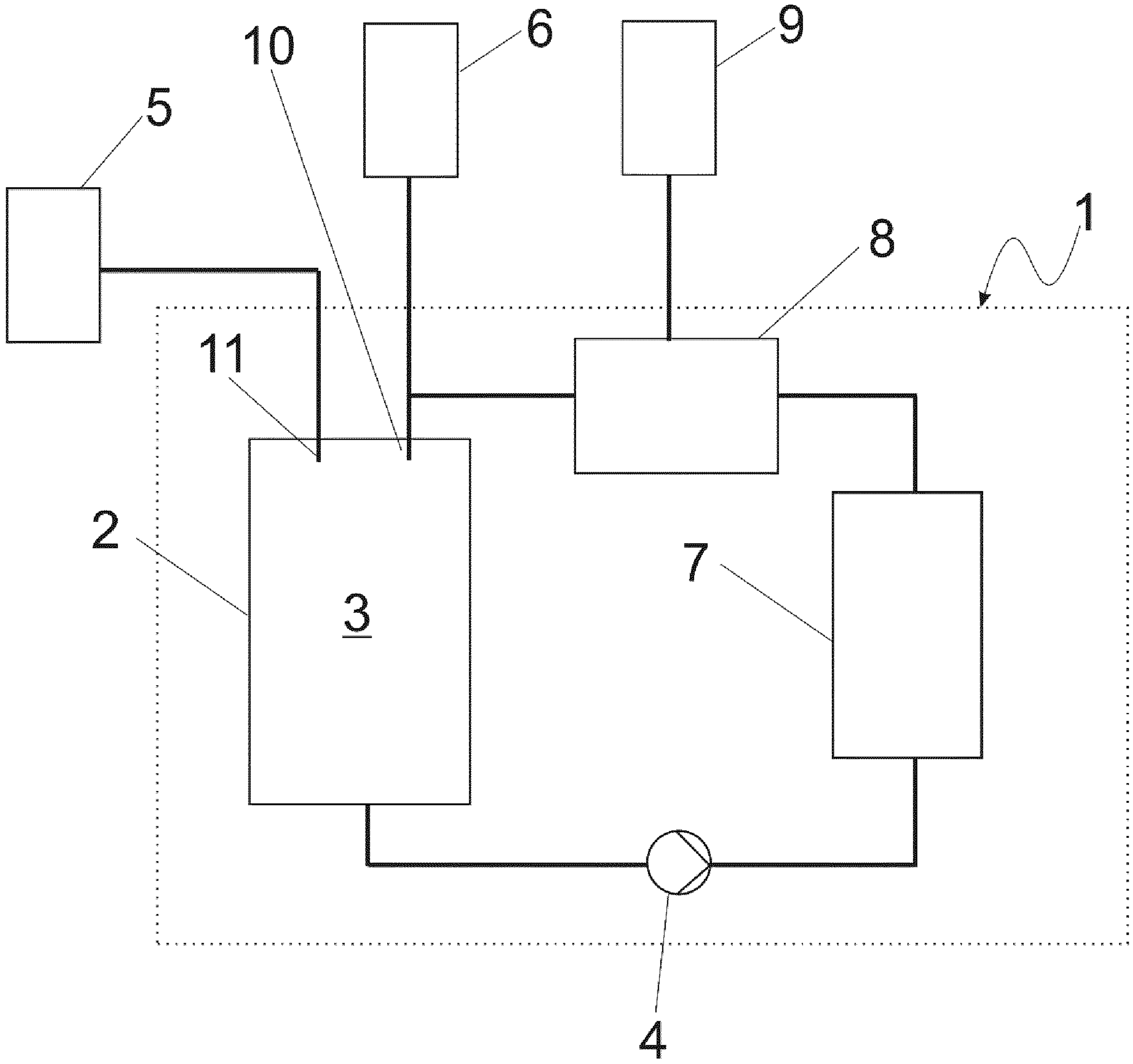

(52) U.S. Cl.
CPC ................. *B01J 2219/00353* (2013.01); *B01J 2219/00601* (2013.01); *B01J 2219/00635* (2013.01); *B01J 2219/00637* (2013.01); *B01J 2219/0072* (2013.01); *B01J 2219/0218* (2013.01); *B01J 2219/0277* (2013.01)

(58) Field of Classification Search
CPC .... B01J 2219/00754; B01J 2219/00279; B01J 2219/0075; B01J 2219/00353; B01J 2219/0218; B01J 2219/00752; B01J 2219/00745; B01J 2219/00583; B01J 2219/0277; B01J 2219/00635; B01J 2219/00637; B01J 2219/00632; B01J 2219/00756; B01J 2219/0036; B01J 2219/0263; B01J 2219/00601; B01J 2219/00747; B01J 2219/0281
See application file for complete search history.

(56) References Cited

U.S. PATENT DOCUMENTS

| | | | | |
|---|---|---|---|---|
| 2009/0098289 | A1 | 4/2009 | Deininger et al. | |
| 2010/0061902 | A1* | 3/2010 | Bradley | C23C 26/00 428/650 |
| 2010/0215562 | A1 | 8/2010 | Sanchez et al. | |
| 2012/0198769 | A1 | 8/2012 | Schirrmeister et al. | |
| 2014/0058174 | A1 | 2/2014 | Bedard et al. | |
| 2016/0138516 | A1 | 5/2016 | Moding | |
| 2018/0085729 | A1* | 3/2018 | Li | C04B 35/48 |

FOREIGN PATENT DOCUMENTS

| | | | |
|---|---|---|---|
| EP | 3 033 304 | | 6/2016 |
| GB | 2 117 415 | | 10/1983 |
| JP | 2009-236259 | A | 10/2009 |
| KR | 100230727 | B2 | 11/1999 |
| WO | 2018/236851 | | 12/2018 |
| WO | 2020/118134 | A2 | 6/2020 |

OTHER PUBLICATIONS

Written Opinion of the ISA for PCT/EP2021/075753, mailed Dec. 21, 2021, 6 pages.

Notice of Preliminary Rejection, KR Patent Appln. No. 2023-7013240, Sep. 15, 2025.

* cited by examiner

CERAMIC COATING ON METAL PARTS TO REDUCE DEPOSIT OF METALLIC TRANSITION METALS IN HYDROGENATION REACTIONS

This application is the U.S. national phase of International Application No. PCT/EP2021/075753 filed Sep. 20, 2021, which designated the U.S. and claims priority to EP patent application No. 20197210.6 filed Sep. 21, 2020, the entire contents of each of which are hereby incorporated by reference.

TECHNICAL FIELD

The present invention relates to the construction of hydrogenation reactors for use with transition metal, particularly palladium, catalysts in the hydrogenation reaction.

BACKGROUND OF THE INVENTION

Diverse metals and alloys are commonly used in technical equipment, particularly in reactors (=reaction vessel) for chemical processes. Very often steel and nickel alloys are frequently used materials for building reactors.

Corrosion and/or wear, i.e. abrasion, by chemicals and solids in heterogenous reaction mixtures may destroy over time the structure of the reactor, such as geometry changes of projecting metal parts or reduction of thickness of walls of tubes or reactor vessel walls or formation of cracks or even holes. By using stainless steel or nickel alloys as material of construction of chemical reactors or critical components of such a chemical reactor frequently the problems raised by corrosion typically can be strongly reduced.

In order to reduce corrosion and/or abrasion of the metal or metal alloy, diverse coatings have been developed to protect such metal substrates. Ceramic coating are a particularly efficient solution to reduce corrosion and/or abrasion of the metallic substrate. Plasma sprayed ceramic coating have been very successfully used for protecting metal substrates from corrosion and/or abrasion particularly in the space and aerospace industries.

In reactors used for hydrogenations, however, it has been observed that metallic transition metals, particularly palladium, which is used as heterogenous hydrogenation catalyst is deposited on the surface of metal parts within the hydrogenation reactor system, particularly on such parts which are exposed to high velocity and shear forces of the hydrogenation mixture comprising the transition metal catalyst. It has been observed that particularly on the surface of impellers of pumps or on the surface of nozzles deposits, i.e. build-ups, of metallic transition metals, particularly palladium, are formed. It has been proven that the transition metal, particularly palladium, is originating from the heterogenous transition metal, particularly palladium, catalyst. Said deposit of metallic transition metal, particularly palladium, may build of layers of significant thickness (up to several millimetres). Due to the deposit of metallic transition metal, particularly palladium, on the surface of the metallic substrate these parts may impose a risk relating to safety or efficiency of the reactor. For example, the impeller of a pump may be blocked or a nozzle may be plugged. As a further disadvantage, the active metallic transition metal, particularly palladium metal, can be lost from the particularly expensive heterogenous catalyst, respectively heterogenous supported palladium catalyst, and thus the catalyst needs to be replaced more frequently. Such deposits, hence, need to be regularly removed from the metal parts. As these deposits of metallic transition metal, particularly palladium, are strongly adhering to the surface of metal substrate it can be very difficult to remove said metallic transition metal deposits. Next to the cost for replacing the lost heterogenous transition metal, particularly palladium, catalyst and the cost relating to the removal of metallic transition metal, particularly palladium, deposits on metal parts of hydrogenation reactors, the need for an interruption of the production line leads to significant cost and losses.

There exists, therefore, a large interest in the chemical industry to reduce or even avoid the deposit of metallic transition metal, particularly palladium, on metal parts of a hydrogenation reactor system.

SUMMARY OF THE INVENTION

Therefore, the problem to be solved by the present invention is to offer a method of reducing the deposit of metallic transition metal, particularly palladium, on a metal parts of a hydrogenation reactor system which is used in the hydrogenation reaction in the presence of hydrogen and a heterogenous transition metal, particularly palladium catalyst.

Surprisingly, it has been found that the method according to claim 1 is able to solve this problem.

Further aspects of the invention are subject of further independent claims. Particularly preferred embodiments are subject of dependent claims.

DETAILED DESCRIPTION OF THE INVENTION

In a first aspect the present invention relates to a method of reducing the deposit of metallic transition metal on a metal part of a hydrogenation reactor system which is used in the hydrogenation reaction in the presence of hydrogen and a heterogenous transition metal catalyst characterized in that said metal part is coated by a ceramic coating which is applied by plasma spraying.

For sake of clarity, some terms used in the present document are defined as follows:

In the present document, a "$C_{x-y}$-alkyl" group is an alkyl group comprising x to y carbon atoms, i.e., for example, a $C_{1-3}$-alkyl group is an alkyl group comprising 1 to 3 carbon atoms. The alkyl group can be linear or branched. For example $—CH(CH_3)—CH_2—CH_3$ is considered as a $C_4$-alkyl group.

In case identical labels for symbols or groups are present in several formulae, in the present document, the definition of said group or symbol made in the context of one specific formula applies also to other formulae which comprises the same said label.

The term "independently from each other" in this document means, in the context of substituents, moieties, or groups, that identically designated substituents, moieties, or groups can occur simultaneously with a different meaning in the same molecule.

In the present document, any dotted line in formulae represents the bond by which a substituent is bound to the rest of a molecule.

The term "hydrogenation reactor" is used in the present document for the vessel in which the hydrogenation reaction is performed.

The term "hydrogenation reaction mixture" in the present document means a mixture of the starting products, i.e. the compound(s) to be hydrogenated, hydrogen, the heterogenous transition metal catalyst, as well as optional substances such as solvents or additives, which are typically used for hydrogenation reactions, as well as impurities, which are introduced by the for aforementioned compounds, as well as any products, which are formed in said hydrogenation reaction.

The term "hydrogenation reactor system" as used in the present document comprises the hydrogenation reactor as well as the additional part of installation which is in contact with the hydrogenation reaction mixture.

The term "metal" as used in the present document comprises also metal alloys.

The term "transition metal" in the present document means a metal of the groups 3 to 12, particularly 4 to 11, of the periodic system.

The term "reduction" or "reducing" is used in the present document in the sense of "less formation" or "forming less", i.e. in view of its general, mechanical meaning, and particularly not in the sense of its chemical meaning.

Heterogenous Transition Metal Catalyst

The above mentioned hydrogenation reaction is performed in the presence of a heterogenous transition metal catalyst. Said heterogenous transition metal catalyst are principally known to the person skilled in the art.

The transition metal is preferably a transition metal form the groups 7, 8, 9 or 10, particularly selected form the group consisting of Pd, Pt, Rh, Ru, Mn, Fe, Co, and Ni, more preferably Pd. Palladium is a noble metal.

The heterogenous transition metal catalyst is preferably a heterogenous supported transition metal catalyst.

In this embodiment, the transition metal is supported on a carrier, i.e. palladium is attached to/or deposited on a carrier. The carrier is a solid material.

Preferably said carrier is carbon or an inorganic carrier. Preferred inorganic carriers are oxides or carbonates. Preferred oxides are oxides of Si, Al, Ce, Ti or Zr, particularly of Al or Si. Particularly preferred are silicon dioxide, alumina and titanium dioxide and ceria.

In case the support is Ce, the preferred oxide is $CeO_2$. Preferably, the oxide of Al is $Al_2O_3$ and AlO(OH). Particularly preferred is $Al_2O_3$.

Silicon dioxide can be used as pyrogenic silica or precipitated or ground silica as carrier. Preferably silicon dioxide used as carrier is pyrogenic or precipitated silica. Most preferred silicon dioxide is a silicon dioxide which is essential pure $SiO_2$. In other words, it is preferred that the silicon dioxide carrier consists of more than 95%, more preferably more than 98%, even more preferred more than 99%, by weight of $SiO_2$. Calcium carbonate is the preferred carbonate. Preferred calcium carbonate is precipitated calcium carbonate.

It is possible that the carrier as used is a mixed oxide. An example of such a mixed oxide is silica-alumina.

A heterogenous supported palladium catalyst is a preferred heterogenous transition metal catalyst.

The supported palladium catalyst can be doped with other metals, for example lead. A well-known catalyst of this type is the "Lindlar catalyst" which is palladium on calcium carbonate doped with lead. Such Lindlar catalysts are for example commercially available from Sigma-Aldrich, Evonik, Johnson-Matthey or Hindustan Platinum.

More preferred heterogenous supported palladium catalyst are palladium on carbon, palladium on silica and palladium on alumina and palladium on a carbonate; even more preferred is palladium on calcium carbonate, most preferred is palladium on calcium carbonate doped with lead.

Most preferred heterogenous transition metal catalyst or heterogenous supported palladium catalysts, respectively, are palladium on carbon catalysts.

The amount of transition metal, particularly palladium, in the hydrogenation catalyst is preferably in the range of from 0.5 to 20% by weight, preferably in the range of from 2 to 10% by weight, more preferably in the range of from 4 to 6% by weight, based on the total weight of the heterogenous transition metal catalyst, particularly heterogenous supported palladium catalyst Preferably the heterogenous transition metal catalyst is a palladium on carbon catalyst, more preferably a palladium on carbon catalyst in which the amount of palladium is in the range of from 0.5 to 20% by weight, preferably in the range of from 2 to 10% by weight, more preferably in the range of from 4 to 6% by weight, based on the total weight of the heterogenous supported palladium catalyst.

Hydrogenation Reaction

The present invention relates to hydrogenation reactions.

In a first embodiment, the hydrogenation reaction is a hydrogenation of particularly molecules having at least one carbon-carbon double or triple bond. In said hydrogenation these carbon-carbon double are hydrogenated to C—C single bonds, respectively, these triple bonds are hydrogenated to carbon-carbon single bonds or selectively to C—C-carbon double bonds. C—C triple bonds are, in a preferred embodiment, selectively hydrogenated to C—C double bonds. Preferred is a hydrogenation of an alkyne to an alkene.

In a preferred embodiment, the hydrogenation is a hydrogenation of alkynols to alkenols. The alkynol has preferably a following structural element

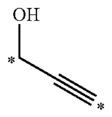

in its structural formula, where * signifies the position(s) of hydrogen or further organic substituent(s).

In an even more preferred embodiment, the alkynol is an alkynol in which the carbon-carbon triple bond is a terminal carbon-carbon triple bond.

In a very preferred embodiment the alkynol has a following structural element

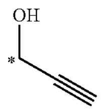

in its structural formula where * signifies the position of further organic substituent(s).

In a very preferred embodiment the alkynol is an alkynol of the formula (I)

(I)

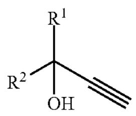

wherein either $R^1$ represents H or a methyl or ethyl group, preferably a methyl or ethyl group; and $R^2$ represents a saturated or unsaturated linear or branched or cyclic hydrocarbyl group with 1 to 46 C atoms which optionally comprises at least one chemical functional group, particularly at least one hydroxyl group;

or $R^1$ and $R^2$ represent together an alkylene group forming a 5 to 7 membered ring;

with the proviso that $R^1$ has the same meaning in formulae (I) and (II) and that $R^2$ has the same meaning in formulae (I) and (II).

In formula (I) the preferred substituent $R^1$ is a methyl group.

It is further preferred that in formula (I) the substituent $R^2$ is a methyl group.

A very preferred alkynol of formula (I) is 2-methylbut-3-yn-2-ol (i.e. $R^1=R^2=$methyl).

In another embodiment, $R^1$ and $R^2$ represent together an alkylene group forming a 5 to 7 membered ring. The alkylene group may be linear or branched and optionally comprises at least one chemical functional group, and/or is olefinically unsaturated.

Preferably the alkylene group is a pentylene group. One of the preferred alkynols of this embodiment is 1-ethynyl-cyclohexan-1-ol.

In a second embodiment, the hydrogenation reaction is hydrogenation of quinones to the respective hydroquinones.

Particularly the quinones are quinones of the formula (XI)

(XI)

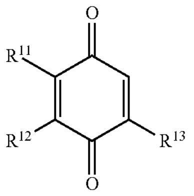

wherein $R^{11}$ represents either H or a $C_{1-12}$-alkyl group, preferably H or a methyl group;

and wherein $R^{11}$ and $R^{12}$ either independently from each other represent either H or a $C_{1-12}$-alkyl group, preferably H or a methyl group;

or form together a cyclo aliphatic 5 to 7 membered ring or an aromatic ring, which optionally is carry further substituents, particularly alkyl or hydroxyl groups.

In case that $R^{11}$ and $R^{12}$ form together a cyclo aliphatic 5 to 7 membered ring or an aromatic ring, $R^{11}$ and $R^{12}$ preferably form the group of formula (XII) or (XIII)

(XII)

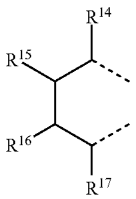

-continued (XIII)

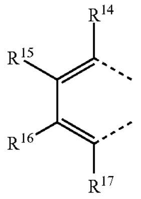

wherein $R^{14}$, $R^{15}$, $R^{16}$ and $R^{17}$ independently from each other represents either H or a $C_{1-12}$-alkyl group, preferably H or a methyl group, or a hydroxyl group.

The following combination of $R^{14}$, $R^{15}$, $R^{16}$ and $R^{17}$ are preferred:

$R^{14}=R^{15}=R^{16}=R^{17}=H$;

or $R^{14}=R^{15}=R^{16}=H$, $R^{17}=OH$;

or $R^{14}=R^{15}=R^{16}=H$, $R^{17}=CH_2$;

or $R^{14}=R^{15}=R^{17}=H$, $R^{16}=OH$;

or $R^{14}=R^{15}=R^{17}=H$, $R^{16}=CH_3$;

$R^{14}=R^{17}=R^{16}=H$, $R^{15}=OH$;

or $R^{14}=R^{17}=R^{16}=H$, $R^{15}=CH_3$;

or $R^{16}=R^{15}=R^{17}=H$, $R^{14}=OH$;

or $R^{16}=R^{15}=R^{17}=H$, $R^{14}=CH_3$;

or $R^{14}=R^{16}=H$, $R^{17}=R^{15}=CH_3$;

or $R^{14}=H$, $R^{17}=R^{15}=CH_3$, $R^{16}=OH$;

or $R^{14}=H$, $R^{16}=R^{15}=CH_3$, $R^{17}=OH$.

The following combination of $R^{11}$ and $R^{12}$ are preferred:

$R^{11}=R^{12}=H$;

or $R^{11}=R^{12}=CH_3$;

or $R^{11}=CH_3$, $R^{12}=H$;

or $R^{12}=CH_3$, $R^{11}=H$.

In case where $R^{11}$ and $R^{12}$ independently from each other represent either H or a $C_{1-12}$-alkyl group, preferably H or a methyl group, the following combination of $R^{11}$ and $R^{12}$ and $R^{13}$ are preferred:

$R^{11}R^{12}=R^{13}=CH_3$;

or $R^{11}=R^{13}=CH_3$, $R^{12}=H$;

or $R^{11}=R^{12}=CH_3$, $R^{13}=H$;

or $R^{12}=R^{13}=CH_3$, $R^{11}=H$;

or $R^{11}=CH_3$, $R^{12}=R^{12}=H$.

Most preferred is the combination $R^{11}=R^{12}=R^{13}=CH_3$.

Most preferred are the quinones of the formula (XI) selected from the group consisting of benzoquinone, 2-methyl benzoquinone, 2,3-dimethyl benzoquinone, 2,5-dimethyl benzoquinone, 2,6-dimethyl benzoquinone, 2,3,5-trimethyl benzoquinone, 5,6,7,8-tetrahydronaphthalene-1,4-dione, 2-methyl-5,6,7,8-tetrahydronaphthalene-1,4-dione, 5-methyl-5,6,7,8-tetrahydronaphthalene-1,4-dione, 6-methyl-5,6,7,8-tetrahydronaphthalene-1,4-dione, 5-hydroxy-5,6,7,8-tetrahydronaphthalene-1,4-dione; 1,4-naphthoquinone, 2-methyl-1,4-naphthoquinone, 5-methyl-1,4-naphthoquinone, 6-methyl-1,4-naphthoquinone, 2,3-dimethyl-1,4-naphthoquinone, 5,6,7,8-tetramethyl-1,4-naphthoquinone, 2,3,5,6,7,8-hexamethyl-1,4-naphthoquinone, 5-hydroxy-1,4-naphthoquinone, 5-hydroxy-2-methyl-1,4-naphthoquinone, 5-hydroxy-3-methyl-1,4-naphthoquinone and 5-hydroxy-2,3-dimethyl-1,4-naphthoquinone.

More preferred are the quinones of the formula (XI) are selected from the group consisting of 2,3,5-trimethyl benzoquinone, 2,3-dimethyl benzoquinone, 2,5-dimethyl benzoquinone, 2,6-dimethyl benzoquinone, 2-methyl benzoquinone and 2-methyl-1,4-naphthoquinone. Most preferred quinones of the formula (XI) is 2,3,5-trimethyl benzoquinone.

By the hydrogenation of the quinones of the formula (XI) the hydroquinones of the formula (XV) is obtained.

(XV)

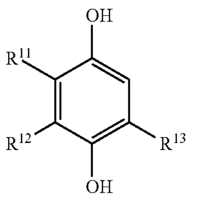

In a third embodiment, the hydrogenation reaction is a hydrogenation of an olefinically unsaturated aldehyde or ketone, or an acetal or ketal thereof, i.e. an aldehyde or ketone having at least one C—C double bond in its structure, to the respective saturated aldehyde or ketone, i.e. the respective aldehyde or ketone, or acetal or ketal thereof, having C—C single bond(s).

In one preferred variant, the unsaturated ketone or unsaturated aldehyde is a ketone or an aldehyde having a carbon-carbon double bond in the α, β-position to the C═O group.

In another preferred variant, the unsaturated ketone or unsaturated aldehyde is a ketone or an aldehyde having a carbon-carbon double bond in the γ, δ-position to the C═O group.

It can be that the unsaturated ketone or the unsaturated aldehyde has a carbon-carbon double bond in the α, β-position as well as a carbon-carbon double bond in the γ, δ-position to the C═O group.

Preferably, the unsaturated ketone or unsaturated aldehyde, or ketal or acetal thereof, has the formula (XX) or (XXI) or (XXII)

(XX)

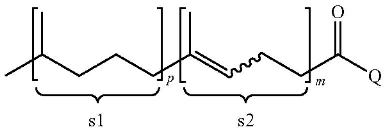

(XXI)

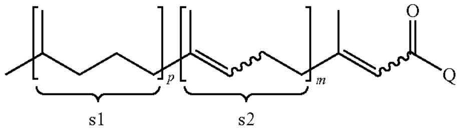

-continued (XXII)

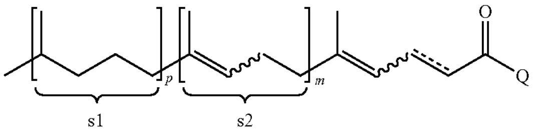

wherein Q stands for H or $CH_3$ and m and p stand independently from each other for a value of 0 to 5 with the proviso that the sum of m and p is 0 to 5, preferably 0 to 3, and where a wavy line represents a carbon-carbon bond which is linked to the adjacent carbon-carbon double bond so as to have said carbon-carbon double bond either in the Z or in the E-configuration and where the substructures in formula (I) and (II) represented by s1 and s2 can be in any sequence; and wherein the double bond having dotted lines (⩦) in formula (XII) represent either a single carbon-carbon bond or a double carbon-carbon bond.

The sum of m and p is preferably 1 to 3, particularly 1 or 2.

Particularly preferred is the unsaturated ketone or unsaturated aldehyde has the formula (XX) or (XXI) or (XXII), particularly being selected from the group consisting of 6-methyl-5-hepten-2-one, 3,7-dimethyloct-6-enal, 3,7-dimethylocta-2,6-dienal, 3,7-dimethyloct-2-enal, 6,10-dimethylundeca-3,5,9-trien-2-one, 6,10-dimethylundeca-5,9-dien-2-one, 6,10-dimethylundec-5-en-2-one, 6,10-dimethyl-undec-3-en-2-one, 6,10-dimethylundec-3,5-diene-2-one, 6,10,14-trimethyl-pentadeca-5,9,13-trien-2-one, 6,10,14-trimethylpentadeca-5,9-dien-2-one and 6,10,14-trimethylpentadec-5-en-2-one as well as all their possible E/Z-isomers.

The hydrogenation reaction is preferably performed at a temperature in of more than 50° C., preferably at a temperature of between 50° C. and 150° C.

In case the molecules to be hydrogenated are quinones a temperature of between 100° C. and 150° C. is preferred.

The hydrogenation reaction is preferably carried out at a hydrogen pressure in the range of from 1 to 25 bara (bar absolute) hydrogen, more preferably at a hydrogen pressure of between 1.1 and 10 bara, even more preferred in the range of from 2 to 10 bara hydrogen.

In case the molecules to be hydrogenated are quinones the preferred hydrogen pressure is 5 to 10 bara.

In case the molecules to be hydrogenated are olefinically unsaturated aldehydes or ketones, or acetals or ketals thereof, the preferred hydrogen pressure is 1 to 3 bara.

The hydrogenation reaction can be carried out without solvent or in the presence of an organic solvent.

In one embodiment, the hydrogenation reaction is carried out in an organic solvent. The organic solvent is preferably selected from the group consisting of hydrocarbons, halogenated hydrocarbons, alcohols, ethers, esters, carbonates, amides, nitriles and ketones and mixtures thereof. More preferred are $C_{4-10}$ aliphatic hydrocarbons, $C_{6-10}$ aromatic hydrocarbons, $C_{6-10}$ aromatic hydrocarbons substituted with one or more $C_{1-4}$ linear alkyl groups or $C_{3-4}$ branched alkyl groups or halogens, $C_{1-4}$ linear alcohols or $C_{3-4}$ branched alcohols, acyclic and cyclic $C_{4-10}$ ethers, $C_{3-10}$ esters, $C_{3-10}$ ketones and mixtures thereof. Especially preferred organic solvents are selected from the group consisting of hexane, heptane, toluene, xylenes, methanol, ethanol, n-propanol, 2-propanol, n-butanol, tert.-butanol, tetrahydrofuran, 2-methyl-tetrahydrofuran, dioxane, ethyl acetate, isopropyl acetate, ethylene carbonate, propylene carbonate, acetone, and mixtures thereof. Particularly preferred as organic solvents are hydrocarbons. The most preferred solvents are aromatic hydrocarbons substituted with at least one methyl group or methanol.

In case the molecules to be hydrogenated are quinones the hydrogenation is performed in the presence of organic solvents, particularly the above mentioned solvents.

In case the molecules to be hydrogenated are olefinically unsaturated aldehydes or ketones, or acetals or ketals thereof, the hydrogenation is performed in the absence of any organic solvents.

It is important to realize that the hydrogenation neither takes place on the ceramic coating which is applied by plasma spraying nor on the metal part which is coated by said ceramic coating.

Hydrogenation Reactor System

The hydrogenation reactor is known by the skilled person in the art. The hydrogenation reactor can be reactor for a batch process or a continuous process.

Next to the hydrogenation reactor, the hydrogenation reactor system also comprises additional parts of installation which is in contact with the hydrogenation reaction mixture.

Exemplary additional parts of installation are particularly connection pipes, valves, sensors, pumps, nozzles, heat exchangers, blades, baffles, fittings, flanches, pressure regulators, filters, stirrers, tubes and any equipment parts for modifying the flow of the hydrogenation reaction mixture.

It is particularly preferred to cover those metal parts which are exposed to high velocity and shear forces of the hydrogenation mixture comprising the transition metal catalyst, particularly the palladium catalyst, with a plasma sprayed ceramic coating. Metals parts which are exposed to impact of the hydrogenation mixture with velocities of more than 5 m/s, particularly more than 7 m/s, are preferably to be coated with a plasma sprayed ceramic coating.

In one embodiment, the metal part is a movable part, particularly an impeller of a pump, preferably an impeller of a circulation pump.

In another embodiment, the metal part is a fixed, i.e. non-movable, part, particularly a nozzle or wear plate of a pump. The wear plate is localized in the very proximity of the impeller, where the hydrogenation reaction mixture is moved rapidly due to the action of the impeller.

The nozzle is particularly a Venturi nozzle.

Metal Part

The present method leads to a significant reduction of deposit of metallic transition metal, particularly palladium, on a metal part of a hydrogenation reactor system.

Said metal part is particularly a metal part which is made of a nickel alloy which comprises more than 50% by weight of nickel, preferably a nickel alloy which is an alloy comprising nickel, chromium and molybdenum, more preferably an nickel alloy which is an alloy comprising nickel, chromium, molybdenum and tungsten.

Most preferred the metal part is made of NiMo16Cr15W. NiMo16Cr15W is the designation used by EN (EN=European Standard) for the specific alloy which is known also by the designation of Alloy C-276 or "Werkstoff-Nr." 2.4819, or UNS N10276 (UNS=Unified Numbering System for Metals and Alloys). It is particularly also known as commercial names such as Hastelloy® C-276, VDM® Alloy C-276 or INCONEL® Alloy C-276.

It is worthwhile to mention that the metal part is not porous, and is particularly not a hydrogen permeable membrane.

Ceramic Coating

The present method leads to a significant reduction of deposit of metallic transition metal, particularly of palladium, on a metal part of a hydrogenation reactor system by coating said metal part by a ceramic coating which is applied by plasma spraying.

It is important to realize that all experiments undertaken with application of other coatings of different kind of polymers or metals or metal alloys or composites have not lead to the desired result.

The process of plasma spraying and plasma sprayed ceramic coatings as well as experimental details are principally known to the person skilled in the art.

In plasma spraying the heat source (plasma) is formed by the generation of a high density arc current in the space between cathode and anode filled with molecular or monoatomic gases such as $H_2$ or Ar. Ionized gases heat up to temperatures of about 15,000° C. and expand outside the nozzle reaching supersonic velocities.

Plasma spraying is a thermal spray process, in which metal or ceramic powders are injected into a plasma flame in order to protect industrial components from wear and corrosion.

The energy generated by the plasma gas—both thermal and kinetic—melts the powder particles and propels them at a high velocity onto the surface of any part requiring a protective coating. The particles impact the surface in a molten state, but rapidly cool to create a nearly impenetrable ceramic coating that adheres strongly to the part's surface.

A plasma spray ceramic coating is harder and stronger than other ceramic coatings due to the application process. The plasma flame is capable of achieving temperatures well over 3,000 degrees Celsius, providing the high thermal energy needed to melt ceramic oxide powders. No other thermal spray process has the capacity to produce enough thermal energy to melt ceramics.

In the present invention the ceramic coating is preferably is a ceramic of aluminium oxide and titanium oxide.

The plasma sprayed ceramic coating on the metal part is typically very thin and very homogeneous.

The thickness of the ceramic coating is preferably in the range of between 50 and 150 micrometres, preferably between 90 and 110 micrometres.

The thickness of said ceramic coating is preferably rather uniform, i.e. the variation of thickness of the plasma sprayed ceramic coating on the metal part preferably varies not more than ±10%, particularly not more than ±5%, over the entire metal part.

The quality and uniformity of ceramic coating is typically very high. Preferably the ceramic coating is as such that there exist no holes (resulting that the metal surface would be in direct contact with the hydrogenation reaction mixture) within the boundaries of the applied ceramic coating.

The plasma sprayed ceramic coating is preferably applied at least to those area of metal parts of the hydrogenation reactor system which are exposed to high velocity and/or shear forces in contact with the hydrogenation reaction mixture.

It is preferred that the metal part is covered completely by the plasma sprayed ceramic coating.

However, it can be advantageous, particularly in view of reducing the cost for coatings, to cover only those area of metal parts of the hydrogenation reactor system which are exposed to high velocity and/or shear forces in contact with the hydrogenation reaction mixture. So for example, it can be (costly) beneficial to coat only the inner surface of a nozzle and leave the unexposed areas of the nozzle uncoated.

The plasma sprayed ceramic coating can be applied to the metal parts either on site of the hydrogenation reactor system or at the site of the manufacturer of said metal parts or at the site of companies specialized on plasma spraying known in the industry.

In some embodiments, it is beneficial to apply at least a further coating on top of the plasma sprayed ceramic coating. It has been found that is advantageous that on top of the ceramic coating particularly a polysiloxane coating is applied. The thickness of the additional coating is preferably in the range of between 0.5 and 20 micrometres, preferably between 1 and 10 micrometres.

Such additional coatings are advantageous as they support the effect of the plasma sprayed ceramic coating, particularly by reduce the roughness of the surface of the ceramic coating, such as by reducing pore number and/or size in the ceramic coating.

It has been shown that the process as described above in great details reduces significantly, even avoids, the formation of any metallic transition metal, particularly palladium, deposit built up on metal parts of a hydrogenation reactor systems. Particularly this is observed on metal parts which are exposed to high velocity and/or shear forces of the hydrogenation mixture comprising the transition metal catalyst, particularly the palladium catalyst. Due to the absence of any metallic transition metal, particularly palladium, deposit on the metal parts said parts have a longer lifetime and/or service time and less maintenance effort for removal any metallic transition metal deposit in the hydrogenation reactor system and as a further benefit, the a heterogenous transition metal catalyst needs to be less frequently replaced. By all these reasons, the invention reduced significantly the cost and labour which are related to the hydrogenation reactions by hydrogen in the presence of a heterogenous metallic transition metal catalyst, particularly heterogenous palladium catalyst.

Hence, in a further aspect the present invention relates also to a hydrogenation reactor system which comprises a metal part which is coated by a ceramic coating which is applied by plasma spraying Said hydrogenation reactor system as well as details for the respective features particularly to metal parts and coatings, have been described and exemplified, particularly by the figures, above in great detail.

In an even further aspect, the present invention relates also to a pump comprising an impeller the surface of which is made of a metal, particularly of a nickel alloy, which is coated by a ceramic coating prepared by plasma spraying.

Said pump as well as details for the respective features particularly to impeller, metal parts and coatings, have been described and exemplified, particularly by the figures, above in great detail.

The pump is preferably a circulation pump. A particularly preferred embodiment of such a pump are circulation pump, is a pump as commercially available from the company Emile Egger & Cie SA, Switzerland (Eggerpumps), particularly in the form of Egger Process Pumps EO/EOS. Such a pump has a very high flow rate of 1000 to 1500 l/s, i.e. of 60 to 90 $m^3$/min. As a consequence of this high flow rate theses pumps have metal parts which are exposed to high velocities and/or shear forces with the pumped medium.

Preferred circulation pumps are centrifugal pumps. The pump is particularly not a rotary vane pump or a progressive cavity pump.

Such a pump is particularly suitable to be used in a hydrogenation reaction in the presence of hydrogen and a heterogenous transition metal catalyst, particularly a heterogenous palladium on carbon catalyst.

FIGURES

FIG. 1 shows a schematic representation of a hydrogenation reactor system.

FIGS. 2*a-f* shows schematic cross-sections through metal parts with and without plasma sprayed ceramic coatings.

Figure 3A:
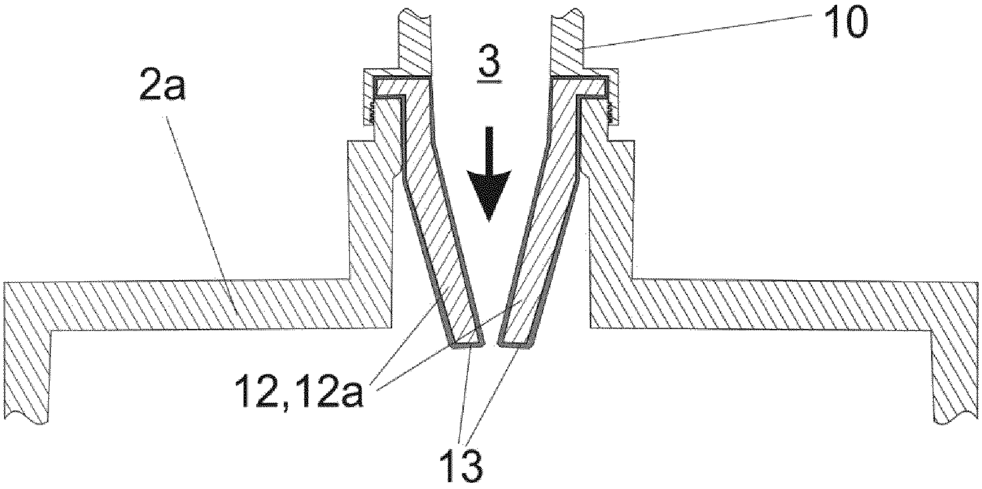
Figure 3B:
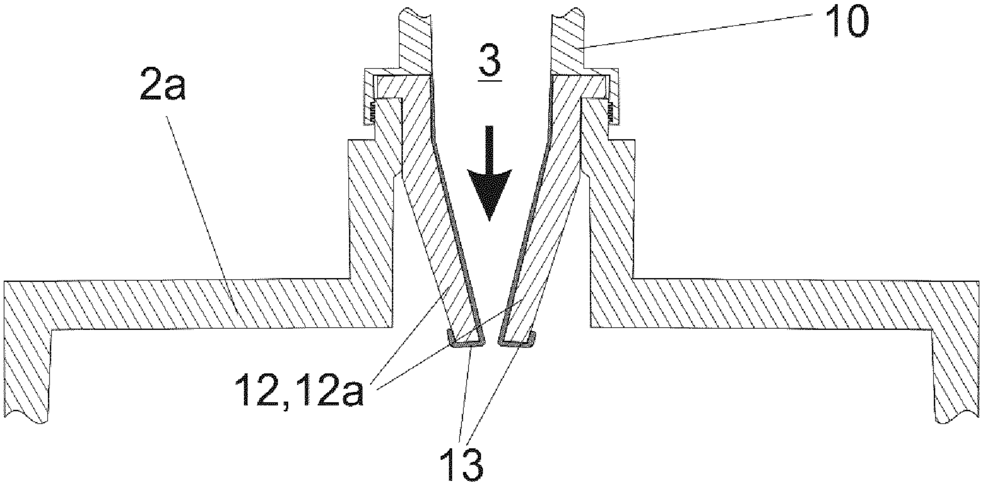

FIGS. 3*a* and 3*b* shows a schematic cross section view through a hydrogenation reactor at the location of the inlet for hydrogenation reaction mixture comprising a nozzle coated by a ceramic coating.

Figure 4:
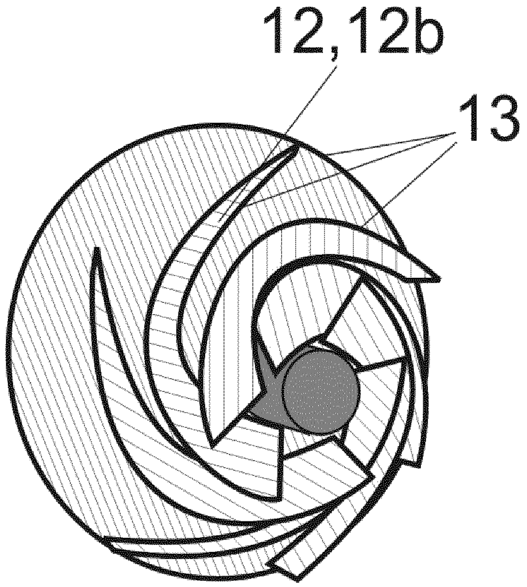

FIG. 4 shows a view of an exemplary impeller of a circular pump coated by a ceramic coating.

Figure 5A:
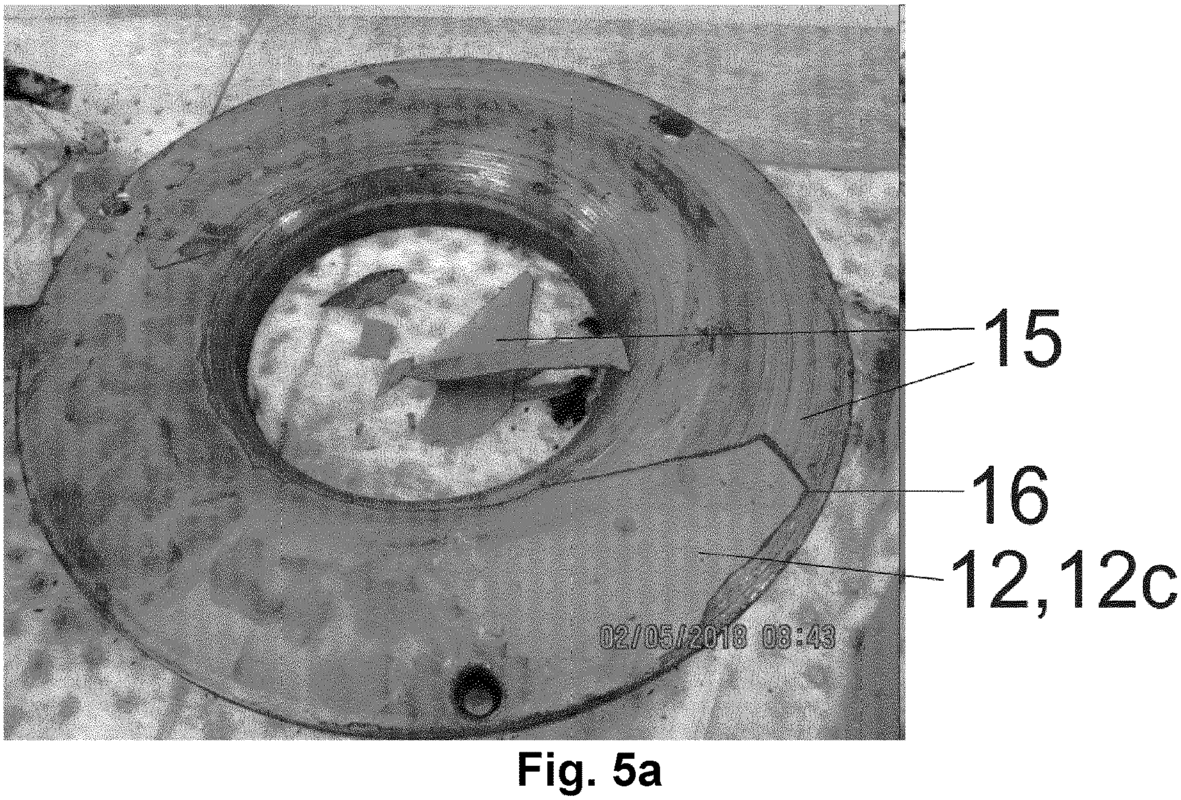
Figure 5B:
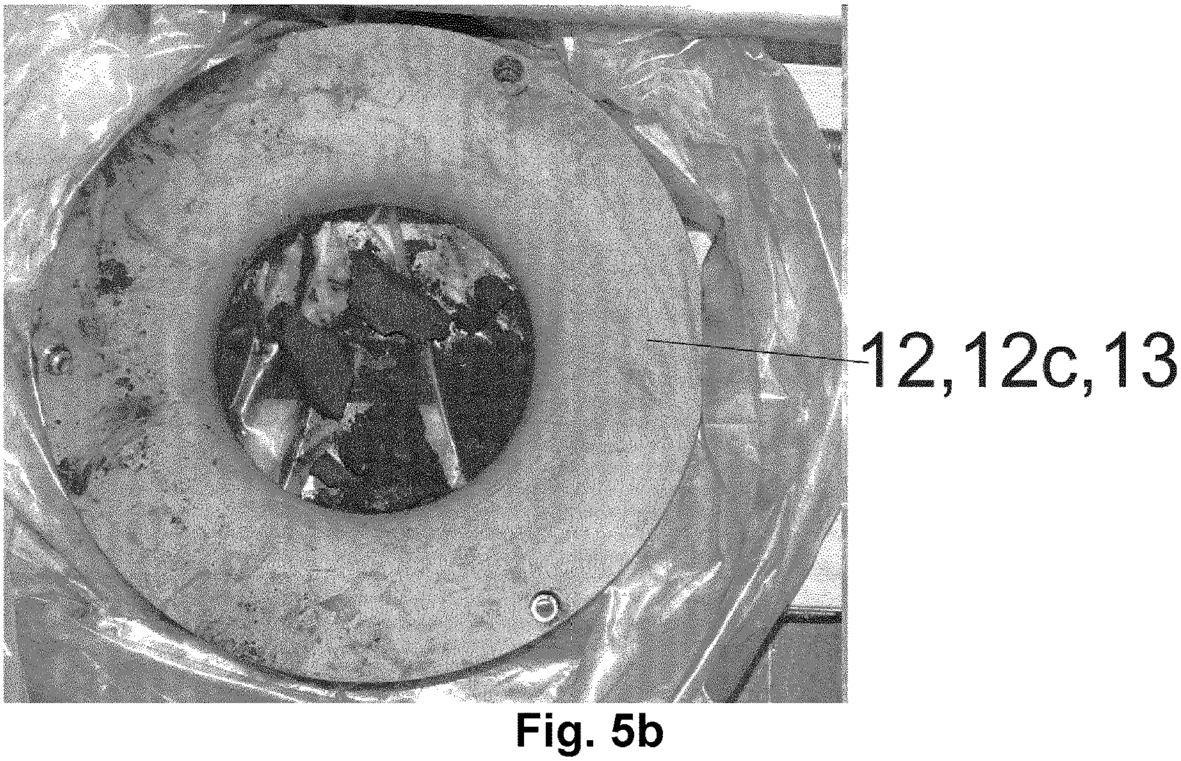

FIGS. 5*a* and 5*b* show photographs of a wear plate of a circulation pump.

The invention is of course not restricted to the exemplary embodiment shown and described.

FIG. 1 shows a schematic representation of a preferred embodiment of a hydrogenation reactor system (1). The hydrogenation reactor (2) is a vessel which might comprise a stirrer. The hydrogenation reaction mixture (3) is feed into the reactor (2) from the container with the starting materials (6) and from the hydrogen gas container (5) by means of the inlet for hydrogenation reaction mixture (10) and the inlet for hydrogen gas (11). The hydrogenation reaction mixture (3) is circulated by means of a circulation pump (4) back to the hydrogenation reactor (2) in which it is introduced again through the inlet for hydrogenation reaction mixture (10). In this loop typically a heat exchanger (7) is localized for optimizing energy consumption. Furthermore, the hydrogenation reaction mixture (3) passes a cross flow filter (8) in which the hydrogenated product is separated and feed into a product collection vessel (9). The hydrogenation reaction mixture (3) reacts in the loop essentially comprising of (2)-(4)-(7)-(8)-(10). The starting product and hydrogen are feed again into the hydrogenation reactor vessel (2) to compensate the amount of products of hydrogenation leaving the loop reactor to assure in a continuous manner the hydrogenation reaction and formation of hydrogenated product.

Figure 2A:
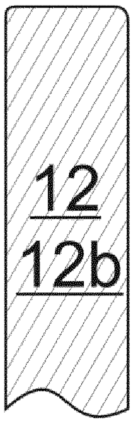

FIG. 2*a* shows a schematic cross section through a metal part (12), which is in this representation in particular an end piece of impeller blade (12*b*) which is not coated by a plasma sprayed ceramic coating. This arrangement corresponds to the state of the art.

Figure 2B:
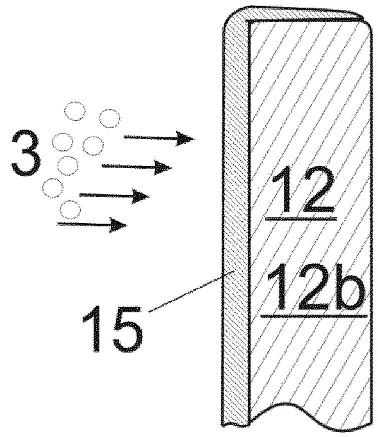

FIG. 2*b* shows the metal part (12) of FIG. 2*a* after extended time (of typically a few months) of contact with the hydrogenation reaction mixture (3). By the intense impact, i.e. high velocities and/or shear forces, (indicated by the arrows) of the hydrogenation reaction mixture (3) with the metal part (12), e.g. impeller blade (12*b*), a thick (typically several millimetres) layer of metallic transition metal, particularly palladium, is built up as a palladium deposit (12*b*), which is strongly adhering to the metal part (12). In this figure it is shown that the palladium deposit is formed primarily on the side of high impact contact. However, in certain cases, metallic transition metal, particularly palladium, deposits can be also observed on the "opposite" side, i.e. the side where the metal is not in direct (high velocity) impact of hydrogenation reaction mixture (3).

Figure 2C:
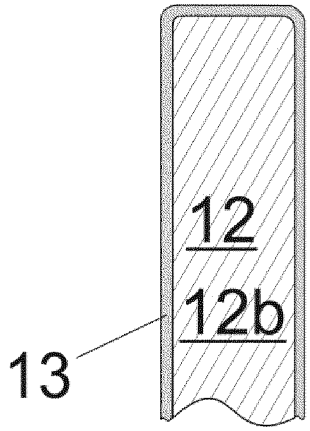

FIG. 2*c* shows a schematic cross section through a metal part (12), which is in this representation in particular an end piece of impeller blade (12*b*) which is coated by a plasma sprayed ceramic coating (13). Said ceramic coating (13) is homogenous, uniform and very thin (typically 50 to 150 micrometres).

Figure 2D:
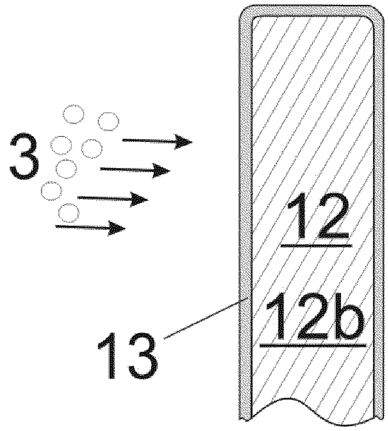

FIG. 2*d* shows the metal part (12) having a plasma sprayed ceramic coating (13) on the surface of the metal part (12) of FIG. 2*c* after extended time (of typically a few months) of contact with the hydrogenation reaction mixture (3). Despite the fact that (as in FIG. 2*b*) the plasma sprayed ceramic coating coated metal part has been exposed to the intense impact, i.e. high velocities and/or shear forces, (indicated by the arrows) of the hydrogenation reaction mixture (3) with the metal part (12), e.g. impeller blade (12*b*), the formation of any metallic transition metal, particularly palladium, layer (metallic transition metal deposit, respectively palladium deposit) on the surface of the plasma sprayed ceramic coated metal part (12), e.g. impeller blade (12*b*), is avoided.

Figure 2E:
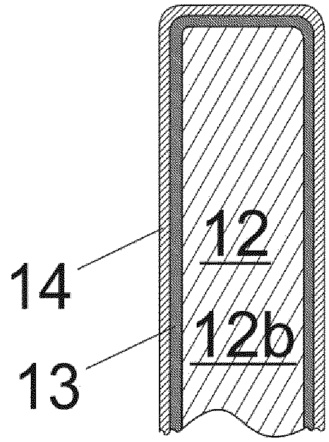

FIG. 2*e* shows a schematic cross section through a further embodiment, in which the metal part (12), which is in this representation in particular an end piece of impeller blade (12*b*) which is coated by a plasma sprayed ceramic coating (13), and which carries an additional coating (14) which is applied to the surface of said plasma sprayed ceramic coating (13). Said ceramic coating is homogenous, uniform and very thin (typically 50 to 150 micrometres). The additional coating is particularly a polysiloxane coating (14). Said additional coating (14) is homogenous, uniform and preferably thin (typically in the range of 1-10 micrometres).

Figure 2F:
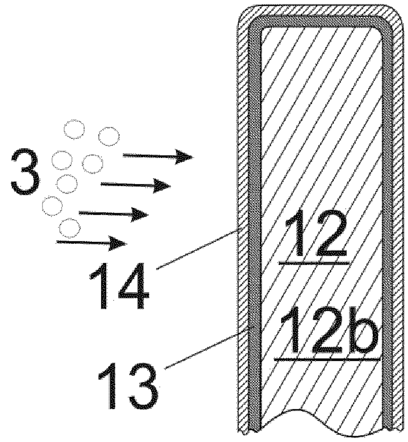

FIG. 2*f* shows the metal part (12) having a plasma sprayed ceramic coating on the surface of the metal part (12) and an additional coating (14) on top of the said plasma sprayed ceramic coating (13) of FIG. 2*e* after extended time (of typically a few months) of contact with the hydrogenation reaction mixture (3). Despite the fact that (as in FIG. 2*b*) the plasma sprayed ceramic coating coated metal part has been exposed to the intense impact, i.e. high velocities and/or shear forces, (indicated by the arrows) of the hydrogenation reaction mixture (3) with the metal part (12), e.g. impeller blade (12*b*), the formation of any metallic transition metal, particularly palladium layer (metallic transition metal deposit, respectively palladium deposit) on the surface of the plasma sprayed ceramic coated metal part (12), e.g. impeller blade (12*b*), respectively on the surface of the additional coating (14), is avoided.

FIG. 3*a* shows a schematic cross section view through a hydrogenation reactor at the location of the inlet for hydrogenation reaction mixture (10) comprising a nozzle (12*a*) coated by a plasma sprayed ceramic coating (13).

The wall of the hydrogenation reactor (2*a*) provides on opening for metal part (12), in this representation a nozzle (12*a*), which is coated homogenously with a uniform thin (typically—micrometres) coating of plasma sprayed ceramic coating (13). The hydrogenation reaction mixture (3) is (re-)fed (direction indicated by arrow) through to the hydrogenation reactor through the inlet (10) for hydrogenation reaction mixture by means of the nozzle (12*a*). Despite the fact that the surface of the ceramic coating (13) applied on the surface of the nozzle is exposed to the intense impact, i.e. high velocities and/or shear forces, of the hydrogenation reaction mixture (3), the formation of any metallic transition metal layer (metallic transition metal deposit), respectively of any palladium layer (palladium deposit) on the surface of the plasma sprayed ceramic coated nozzle is inhibited and no plugging of the nozzle is observed even after extended times of contact.

FIG. 3*b* shows a schematic cross section view through an embodiment of a hydrogenation reactor at the location of the inlet for hydrogenation reaction mixture (10) comprising a nozzle (12*a*) coated by a plasma sprayed ceramic coating (13) identical to FIG. 3*a* with the exception that the nozzle is coated only the inside of the nozzle, i.e. in the area where the nozzle is exposed to high velocity and/or shear forces in contact with the hydrogenation reaction mixture.

FIG. 4 shows of a view of an exemplary impeller (12*b*) of a circular pump, a preferred embodiment of a metal part (12), coated by a ceramic coating. The impeller (12*b*) schematically shown in this figure has some impeller blades which are positioned around a central shaft and is part of a circulation pump, as commercially available from the company Emile Egger & Cie SA, Switzerland (Eggerpumps), particularly in the form of Egger Process Pumps EO/EOS.

FIG. 5*a* shows of photograph of a wear plate (12*c*) of an circulation pump (4), as commercially available from the company Emile Egger & Cie SA, Switzerland (Eggerpumps) without any ceramic coating. As can be clearly observed, the surface of the wear plate (12*c*), i.e. the metal part (12), is covered by a thick (ca. 1 to 3.5 mm) metallic transition metal deposit, i.e. palladium deposit, (15) (visible at the breaking edge (16) of the metallic transition metal deposit, i.e. palladium deposit) which have been formed during service of 3 months in the hydrogenation reactor system (hydrogenation loop reactor, as outlined in FIG. 1) for the hydrogenation of trimethyl benzoquinone (TMQ) to trimethylhydroquinone (TMHQ). The photograph also shows some pieces of said metallic transition metal deposit, i.e. palladium deposit, which have been removed by mechanical chipping near the edge (16) of the metallic transition metal deposit, i.e. of the palladium, from the wear plate's surface and placed for documentation purposes inside the suction inlet of the wear plate.

FIG. 5*b* shows of photograph of an identical wear plate (12*c*) of an circulation pump (4), as commercially available from the company Emile Egger & Cie SA, Switzerland (Eggerpumps), on the surface of which a ceramic coating ($Al_2O_3/TiO_2$, 100 micrometres thick) has been applied by plasma spraying after 3 months of service in the hydrogenation reactor system identical as for FIG. 5*a*. This photograph clearly shows that no metallic transition metal deposit, i.e. palladium deposit, has been formed.

Hence, the comparison of photographs of FIG. 5*b* and of FIG. 5*a* impressively provides clear evidence of the effect of the present invention.

LIST OF REFERENCE SIGNS

1 Hydrogenation reactor system
2 Hydrogenation reactor vessel
2*a* Wall of hydrogenation reactor vessel
3 Hydrogenation reaction mixture
4 Circulation pump
5 Hydrogen gas container
6 Container with starting materials
7 Heat Exchanger
8 Cross flow filter
9 Product collection vessel
10 Inlet for hydrogenation reaction mixture
11 Inlet for hydrogen gas
12 Metal part
12*a* Nozzle
12*b* Impeller
13 Ceramic coating

14 Additional coating

15 Metallic transition metal deposit, palladium deposit

16 Edge of metallic transition metal deposit, edge of palladium deposit

EXAMPLES

A ceramic coating ($AL_2O_3/TiO_2$, 100 μm) has been applied by plasma spraying to the surface of an impeller and a wear plate of an Egger Process Pumps EO/EOS as well as a Venturi nozzle of a hydrogenation reactor, all being made of Hastelloy® C-276. These plasma sprayed ceramic coated components showed a high degree of homogeneity and uniformity. The coated parts were installed in a hydrogenation loop reactor, as outlined in FIGS. 1 and 3, and used for the hydrogenation of trimethyl benzoquinone (TMQ) to trimethylhydroquinone (TMHQ) using hydrogen and a palladium on carbon catalyst for a time of 3 months. In contrast to the uncoated metal parts where formerly thick (1-3.5 mm) layers of palladium deposit have been observed, no palladium deposits could be found on these plasma sprayed ceramic coated nozzle, wear plate and impeller. The photographs of FIGS. 5*a* and 5*b* show the respective wear plate after 3 month of service with (FIG. 5*b*) and without (FIG. 5*a*) the ceramic coating.

The significant loss in heterogenous supported palladium catalyst using the uncoated parts was no longer observed and no negative influences in quality of the product or the process could be observed.

The invention claimed is:

1. A method of reducing metallic transition metal deposits on a metal part of a hydrogenation reactor system, wherein the method comprises:

(a) providing a hydrogenation reactor system having a metal part that is exposed to the presence of hydrogen and a heterogenous transition metal catalyst during a hydrogenation reaction; and (b) applying a ceramic coating onto the metal part by plasma spraying to form a ceramic coated metal part of the hydrogenation reactor system which exhibits reduced metallic transition metal deposits thereon due to exposure to hydrogen and the heterogenous transition metal catalyst during the hydrogenation reaction.

2. The method according to claim 1, wherein the transition metal is a transition metal from Groups 7, 8, 9 or 10 of the Periodic Table.

3. The method according to claim 1, wherein the heterogenous transition metal catalyst is a heterogenous supported transition metal catalyst.

4. The method according to claim 1, wherein the metal part is a movable part of the hydrogen reactor system.

5. The method according to claim 4, wherein the metal part is an impeller of a pump.

6. The method according to claim 4, wherein the metal part is an impeller of a circulation pump.

7. The method according to claim 1, wherein the ceramic coating is a ceramic of aluminum oxide and titanium oxide.

8. The method according to claim 1, wherein the metal part is made of a nickel alloy which comprises more than 50% by weight of nickel.

9. The method according to claim 8, wherein the nickel alloy is an alloy comprising nickel, chromium and molybdenum.

10. The method according to claim 8, wherein the nickel alloy is an alloy comprising nickel, chromium, molybdenum and tungsten.

11. The method according to claim 1, wherein the metal part is made of NiMo16Cr15W.

12. The method according to claim 1, wherein the hydrogenation reaction is performed in an organic solvent.

13. The method according to claim 1, wherein the hydrogenation reaction is performed at a temperature of more than 50° C.

14. The method according to claim 13, wherein the hydrogenation reaction is performed at a temperature between 50° C. and 150° C.

15. The method according to claim 1, wherein the heterogenous transition metal catalyst is a heterogeneous supported palladium on carbon catalyst.

16. The method according to claim 15, wherein the palladium is present in an amount of 0.5 to 20% by weight, based on the total weight of the heterogenous supported palladium on carbon catalyst.

17. The method according to claim 16, wherein the palladium is present in an amount of 2 to 10% by weight, based on the total weight of the heterogenous supported palladium on carbon catalyst.

18. The method according to claim 16, wherein the palladium is present in an amount of 4 to 6% by weight, based on the total weight of the heterogenous supported palladium on carbon catalyst.

19. The method according to claim 1, wherein the hydrogenation reaction is performed at an elevated pressure of between 1.1 and 10 bara.

20. The method according to claim 1, wherein the ceramic coating has a thickness which is between 50 and 150 micrometers.

21. The method according to claim 20, wherein the thickness of the ceramic coating is between 90 and 110 micrometres.

22. The method according to claim 1, wherein the transition metal is selected from the group consisting of Pd, Pt, Rh, Ru, Mn, Fe, Co, and Ni.

* * * * *